United States Patent
Chang et al.

(10) Patent No.: US 9,652,179 B2
(45) Date of Patent: May 16, 2017

(54) MEMORY SYSTEM AND A DATA MANAGING METHOD THEREOF

(71) Applicant: MACRONIX INTERNATIONAL CO., LTD., Hsinchu (TW)

(72) Inventors: Hung-Sheng Chang, Taipei (TW);
Hsiang-Pang Li, Zhubei (TW);
Chun-Ta Lin, Kaohsiung (TW);
Yuan-Hao Chang, Taipai (TW);
Tei-Wei Kuo, New Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 14/811,970

(22) Filed: Jul. 29, 2015

(65) Prior Publication Data
US 2016/0154593 A1    Jun. 2, 2016

Related U.S. Application Data

(60) Provisional application No. 62/085,662, filed on Dec. 1, 2014.

(51) Int. Cl.
*G06F 3/06* (2006.01)

(52) U.S. Cl.
CPC ............ *G06F 3/0673* (2013.01); *G06F 3/061* (2013.01); *G06F 3/064* (2013.01); *G06F 3/0608* (2013.01); *G06F 3/0641* (2013.01)

(58) Field of Classification Search
CPC ........ G06F 3/0673; G06F 3/064; G06F 3/061; G06F 3/0608; G06F 3/0641; G06F 3/06
See application file for complete search history.

(56) References Cited

U.S. PATENT DOCUMENTS

| | | | | |
|---|---|---|---|---|
| 6,101,547 A | * | 8/2000 | Mukherjee | ......... H04N 21/2312 709/230 |
| 6,839,823 B1 | * | 1/2005 | See | ...................... G06F 12/023 711/103 |
| 6,898,634 B2 | * | 5/2005 | Collins | ................ G06F 3/0608 709/215 |
| 7,346,732 B2 | * | 3/2008 | Yagisawa | ................ G06F 3/061 711/112 |
| 7,797,486 B2 | * | 9/2010 | Yagisawa | ................ G06F 3/061 711/112 |
| 7,941,600 B2 | * | 5/2011 | Yagisawa | ................ G06F 3/061 711/112 |

(Continued)

OTHER PUBLICATIONS

Lin, et al.: "Free Space Management of Dedup-based PCM Storage Devices"; Macronix International Co., Ltd., Hsinchu 300, Taiwan, R.O.C.; Nov. 21, 2014; pp. 1-10.

*Primary Examiner* — Christopher D Birkhimer
(74) *Attorney, Agent, or Firm* — McClure, Qualey & Rodack, LLP

(57) ABSTRACT

A memory system is provided. The memory system includes a memory controller and a first memory block. The first memory block is configured to store a first data from a top of the first memory block in a top-down fashion. The first memory block is configured to store a first metadata corresponding to the first data from a bottom of the first memory block in a bottom-up fashion. The first data forms a first data area. The first metadata forms a first metadata area. And a first continuous space is formed between a bottom of the first data area and a top of the first metadata area.

12 Claims, 6 Drawing Sheets

(56) References Cited

U.S. PATENT DOCUMENTS

| | | | | |
|---|---|---|---|---|
| 8,015,352 B2* | 9/2011 | Zhang | ................... | G06F 3/061 |
| | | | | 711/113 |
| 8,131,922 B2* | 3/2012 | Yagisawa | ................ | G06F 3/061 |
| | | | | 711/112 |
| 8,417,886 B2* | 4/2013 | Yagisawa | ................ | G06F 3/061 |
| | | | | 711/112 |
| 2002/0129049 A1* | 9/2002 | Collins | ................ | G06F 3/0608 |
| | | | | 715/205 |
| 2006/0161756 A1* | 7/2006 | Yagisawa | ................ | G06F 3/061 |
| | | | | 711/171 |
| 2008/0140929 A1* | 6/2008 | Yagisawa | ................ | G06F 3/061 |
| | | | | 711/113 |
| 2010/0318735 A1* | 12/2010 | Yagisawa | ................ | G06F 3/061 |
| | | | | 711/113 |
| 2011/0185118 A1* | 7/2011 | Yagisawa | ................ | G06F 3/061 |
| | | | | 711/113 |
| 2012/0159068 A1* | 6/2012 | Yagisawa | ................ | G06F 3/061 |
| | | | | 711/113 |
| 2012/0233522 A1* | 9/2012 | Barton | ................... | H04L 67/06 |
| | | | | 714/758 |
| 2014/0223089 A1* | 8/2014 | Kang | ................ | G06F 12/0246 |
| | | | | 711/103 |

* cited by examiner

MEMORY SYSTEM AND A DATA MANAGING METHOD THEREOF

This application claims the benefit of U.S. Provisional application Ser. No. 62/085,662, filed Dec. 1, 2014, the subject matter of which is incorporated herein by reference.

BACKGROUND

Technical Field

The disclosure relates in general to a memory system and a data managing method for the memory system.

Description of the Related Art

For memory system, there is a need to utilize the storage space of the memory system efficiently to reduce the size of the memory system. A typical method is data deduplication to identify the duplicated data and avoiding storing duplicated data. However, the duplicated data could be separated into different chunks, and the size of each chunk may be different. Since the sizes of the chunks are different, it is hard to predict the size of the chunks and the different size of chunks storing in the memory system may produce fragmentation between data or between chunks. And if some data needs to be segmented and stored in different spaces of the memory system, a data structure is needed to record the data segmentation. The data structure needs additional space and result in management issues. Therefore, there is a strong desire to provide a data managing method of the memory system to utilize the storage space efficiently and to maximize the continuous space of the memory system for storing data.

SUMMARY

According to the disclosure, a memory system is provided. The memory system includes a memory controller and a first memory block. The first memory block is configured to store a first data from a top of the first memory block in a top-down fashion. The first memory block is configured to store a first metadata corresponding to the first data from a bottom of the first memory block in a bottom-up fashion. The first data forms a first data area. The first metadata forms a first metadata area. And a first continuous space is formed between a bottom of the first data area and a top of the first metadata area.

According to the disclosure, a data managing method for a memory system is provided. The memory system includes a memory controller and a first memory block. The data managing method includes the following steps. Sensing an initial value of a first electrical parameter of the memory device. Storing a first data to a top of the first memory block in a top-down fashion. And storing a first metadata corresponding to the first data to a bottom of the first memory block in a bottom-up fashion. The first data forms a first data area. The first metadata forms a first metadata area. And a first continuous space is formed between a bottom of the first data area and a top of the first metadata area.

The accompanying drawings, which are incorporated in and constitute a part of this specification, illustrate disclosed embodiments and, together with the description, serve to explain the disclosed embodiments.

DETAILED DESCRIPTION

Figure 1:
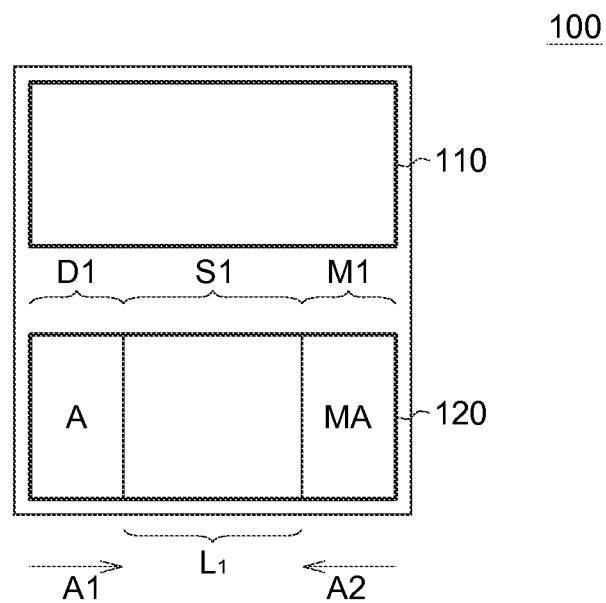
FIG. 1 shows a block diagram of a memory system 100 according to a first embodiment of the present disclosure.

In the present disclosure, a memory system and a data managing method for the memory system are provided to utilize the storage space of the memory system more efficiently. Several embodiments are provided hereinafter with reference to the accompanying drawings for describing the related configurations and procedures. However, the present disclosure is not limited thereto. The identical and/or similar elements of the embodiments are designated with the same or similar reference numerals.

FIG. 1 shows a block diagram of a memory system 100 according to a first embodiment of the present disclosure. In this embodiment, the memory system 100 is a byte-addressable memory, such as phase change memory, a bit-alterable NAND flash memory, a NOR flash memory, a Magnetic-RAM, or a Resistive-RAM, and so on. The memory system 100 includes a memory controller 110 and a first memory block 120. In the first embodiment, the first memory block 120 is for storing a first data A from a top of the first memory block in a top-down fashion, as shown in arrow A1. And the first memory block 120 is further for storing a first metadata MA corresponding to the first data A from a bottom of the first memory block 120 in a bottom-up fashion, as shown in arrow A2. In this embodiment, the first data A forms a first data area D1, the first metadata MA forms a first metadata area M1 and a first continuous space S1 is formed between a bottom of the first data area D1 and a top of the first metadata area M1. The memory system 100 provides a large continuous space S1 in the first memory block 120 for storing data and metadata.

Figure 2:
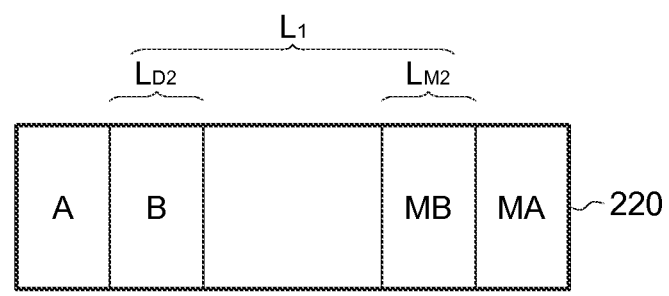
FIG. 2 shows a diagram of the first memory block 120 according to a second embodiment of the present disclosure.

In some embodiments, the memory controller 110 determines whether a size of a second data $L_{D2}$ and a size of a second metadata corresponding to the second data $L_{M2}$ are bigger than a size of the first continuous space $L_1$. If the size of the second data $L_{D2}$ and the size of the second metadata corresponding to the second data $L_{M2}$ are not bigger than the size of the first continuous space $L_1$, the first memory block stores the second data B to a top of the first continuous space in the top-down fashion, and stores the second metadata MB corresponding to the second data B to the bottom of the first continuous space in the bottom-up fashion, as shown memory block 220 in FIG. 2.

Figure 3:
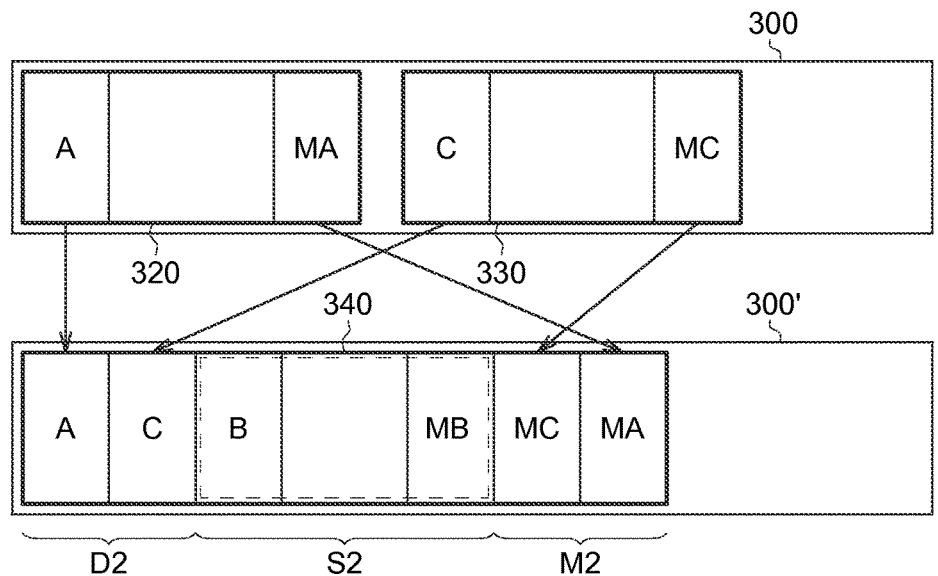
FIG. 3 shows a block diagram of a data allocation of a memory system before and after a merging operation according to a second embodiment of the present disclosure.

FIG. 3 shows a block diagram of a data allocation of a memory system before (300) and after (300') a merging operation according to a second embodiment of the present disclosure. In this embodiment, the memory system includes a first memory block 320 and a second memory block 330. The second memory block 330 is for store at least one data C from a top of the second memory block 330 in the top-down fashion, and for storing at least one metadata MC corresponding to the at least one data C from a bottom of the second memory block 330 in the bottom-up fashion. If the size of the second data $L_{D2}$ and the size of the second metadata corresponding to the second data $L_{M2}$ are bigger than the size of the first continuous space $L_1$, the memory controller merges the first memory block 320 and the second memory block 330 to generate a third memory block 340 in the memory system 300'. And the first data A and the data of the second memory block C is moved to a top of the third memory block 340 in the top-down fashion. And the first metadata MA corresponding to the first data A and the metadata MC corresponding to the data C of the second memory block 330 to a bottom of the third memory block 340 in the bottom-up fashion. After the merging operation, the first data A and the at least one data C of the second memory block 330 forms a second data area D2, the first metadata MA and the at least one metadata MC corresponding to the at least one data C of the second memory block 330 forms a second metadata area M2 and a second continuous space S2 is formed between a bottom of the second data area D2 and a top of the second metadata area M2. In this case, the memory controller may determine whether the size of the second data $L_{D2}$ and the size of a second metadata corresponding to the second data $L_{M2}$ are bigger than the size of the second continuous space $L_2$. If the size of the second data $L_{D2}$ and the size of a second metadata corresponding to the second data $L_{M2}$ are not bigger than the size of the second continuous space $L_2$, the third memory block 340 stores the second data B to a top of the second continuous space S2 in the top-down fashion, and stores the second metadata MB corresponding to the second data B to the bottom of the second continuous space S2 in the bottom-up fashion.

In some embodiments, the memory system may include multiple memory blocks, and the size of each memory blocks may be different. Each memory blocks may store data to the top of each memory block in the top-down fashion and stores metadata to the bottom of each memory block in the bottom-up fashion. The memory controller may determine whether the size of a data to be stored and the size of the metadata corresponding to the data to be stored are bigger than the size of one of the continuous space of one of the memory block. And then the memory controller may merge the memory block several times until the continuous space of the merged memory block has enough space for the data and the metadata to be stored.

Figure 4:
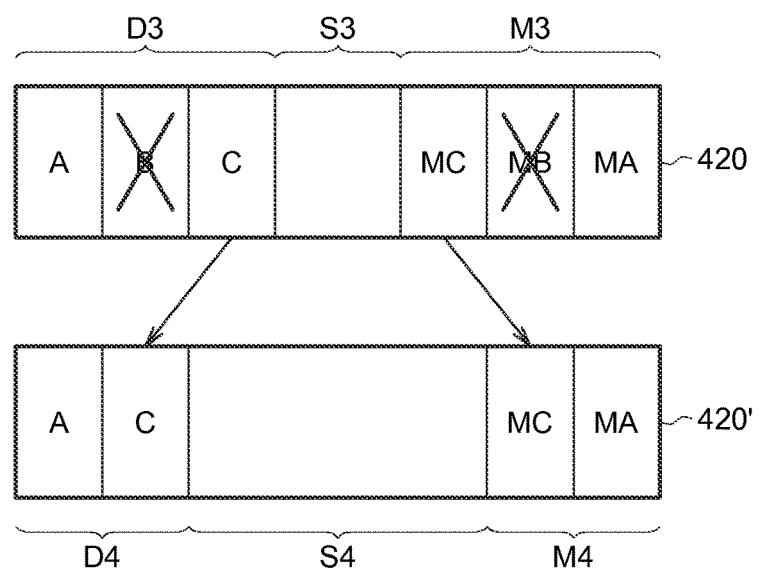
FIG. 4 shows a diagram of a data allocation of the first memory block before and after a repacking operation according to a third embodiment of the present disclosure.

FIG. 4 shows a diagram of a data allocation of the first memory block before (420) and after (420') a repacking operation according to a third embodiment of the present disclosure. In this embodiment, the first memory block 420 stores a first data A, a second data B and a third data C to the top of the first memory block 420 in the top-down fashion, and stores a first metadata MA, a second metadata MB and a third metadata MC to the bottom of the first memory block 420 in the bottom-up fashion. Similarly, the first data A, the second data B, and the third data C form a third data area D3. The first metadata MA, the second metadata MB, and the third metadata MC form a third metadata area M3. And the third continuous space S3 is formed between a bottom of the third data area D3 and a top of the third metadata area M3.

And after a period of time, if the second data B is being deleted and needs to be removed, the memory controller removes the second data B from the first memory block 420, and removes the second metadata MB corresponding to the second data B from the first memory block 420. After the second data B and the second metadata MB is being removed, there is an empty space between the first data A and the third data C and an empty space between the first metadata MA and the third metadata MC. Therefore, a repacking operation is needed in order to have a larger continuous space in the first memory block. In a repacking operation, the memory controller moves the third data C to a bottom of the first data A, and moves the third metadata MC to a top of the first metadata MA. And after the repacking operation, the first data A and the third data C form a fourth data area D4, and the first metadata MA and the third metadata MC form a fourth metadata area M4. And thus, the first memory block 420' after the repacking operation includes a larger continuous space S4 formed between a bottom of the fourth data area D4 and a top of the fourth metadata area M4.

In some embodiments, the memory block may include multiple data, and when one of the data is being removed from the memory block, the memory controller further moves the following data of the removed data to the bottom of previous data in the top-down fashion, and moves the following metadata of the removed metadata to the top of the previous metadata in the bottom-up fashion until there is no empty space between the multiple data and there is no empty space between the multiple metadata.

Figure 5:
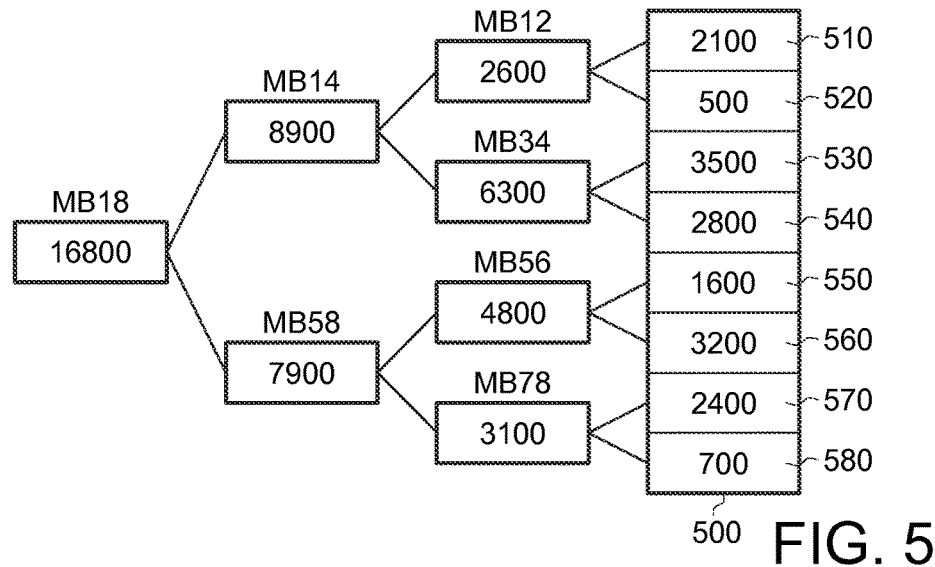
FIG. 5 shows a diagram of a buddy tree of a memory system 500 according to a fourth embodiment of the present disclosure.

In some embodiments, the memory system may perform the merging operation and repacking operation to have larger continuous space in each memory blocks. And the memory controller may determine which memory blocks to be merged according to a buddy tree. For example, FIG. 5 shows a diagram of a buddy tree of a memory system 500 according to a fourth embodiment of the present disclosure. In this embodiment, the memory system 500 includes 8 memory blocks (510-580), each size of remaining space of the memory blocks is 2100, 500, 3500, 2800, 1600, 3200, 2400, and 700, respectively. The buddy tree adds two size of continuous space of two memory blocks to form a first level virtual memory blocks, i.e. MB12, MB34, MB56, and MB78. Each size of continuous space of the first level virtual memory block MB12, MB34, MB56, and MB78 is 2000, 6300, 4800, and 3100, respectively. And then the buddy tree adds two size of continuous space of two first level virtual memory blocks to form a second level virtual memory blocks, i.e. MB14 and MB58. Each size of continuous space of the second level virtual memory block MB14 and MB58 is 8900, and 7900, respectively. And then the buddy tree adds two size of continuous space of two second level virtual memory blocks to form a third level virtual memory blocks, i.e. MB18, and the size of continuous space of the third level virtual memory block MB18 is 16800.

And if a data to be stored needs a size of 6000 continuous space, the memory controller may determine whether the highest level virtual memory block have enough continuous space. For example, the memory controller determines that the size of continuous space of the third level virtual memory block MB18 is 16800, which is larger than the size of the data to be stored (6000), then the memory controller further determines whether the second level virtual memory block have enough continuous space. In this example, the second level virtual memory MB34 has enough continuous space (6300), and then the memory controller merging the memory block 530 and the memory block 540 to form the continuous space (6300) for storing the desired data.

It is noted that the above process is not limited thereto. In other embodiments, the memory controller may judges from the lowest level virtual memory block to higher level memory blocks to determine whether the virtual memory block have enough remaining space. Also, the memory controller may determine which memory blocks to be merged according to a link list.

Figure 6:
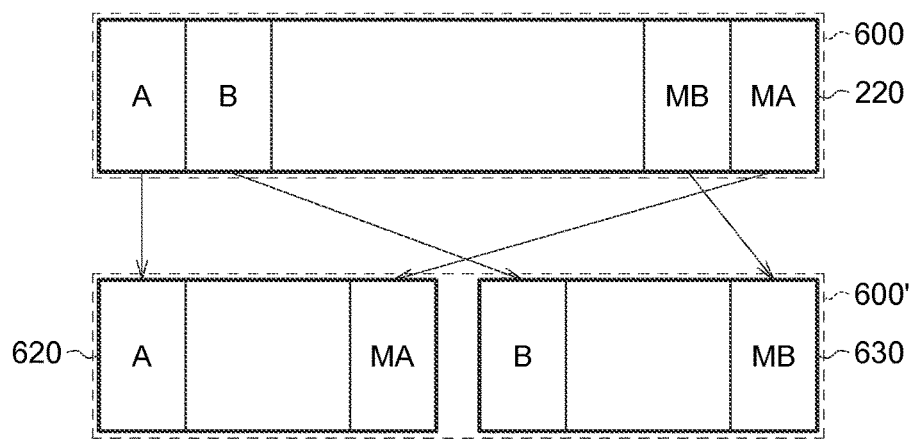
FIG. 6 shows a diagram of a data allocation of a memory system before and after a splitting operation according to the second embodiment of the present disclosure.

On the other hand, a memory block may be split into two or more memory blocks. FIG. 6 shows a diagram of a data allocation of a memory system before (600) and after (600') a splitting operation according to the second embodiment of the present disclosure. In some embodiments, the memory controller may determine whether the size of the first memory block 220 is bigger than a first value, e.g. 64 KB. The first value is not limited and can be adjusted by design. When the size of the first memory block is bigger than the first value (64 KB), the cost of memory block repacking may be increased. Therefore, a splitting operation is needed to prevent the increased overhead of the repacking operation. In the splitting operation, the memory controller splits the first memory block 220 into a fourth memory block 620 and a fifth memory block 630. The memory controller then moves the first data A to a top of the fourth memory block 620, and moves the first metadata MA to a bottom of the fourth memory block 620. The memory controller then moves the second data B to a top of the fifth memory block 630, and moves the second metadata MB to a bottom of the fifth metadata 630.

In some embodiments, the memory system may further split the fourth memory block 620 into more memory blocks if the size of the fourth memory block 620 is still bigger than the first value (64 KB). In some other embodiments, the memory controller may determine which memory blocks to be split according to the buddy tree shown in FIG. 5.

Figure 7:
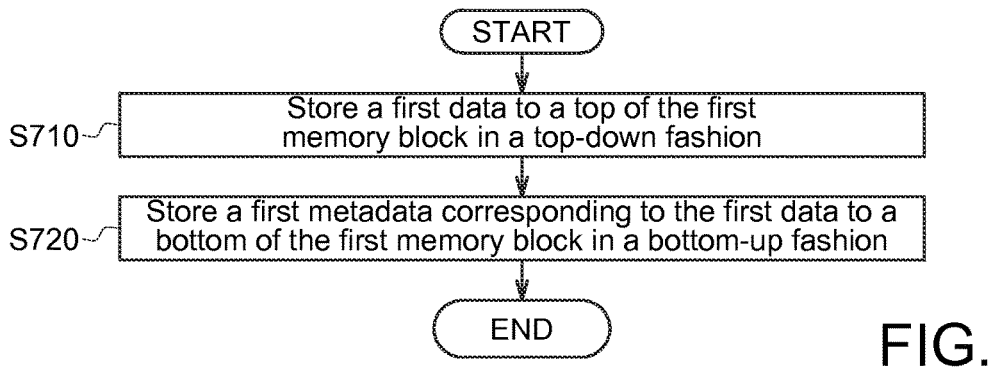
FIG. 7 shows a flow chart of the data managing method for the memory system according to the first embodiment of the present disclosure.

Based on the above, a data managing method for the memory system described above is provided. FIG. 7 shows a flow chart of the data managing method for the memory system 100 according to the first embodiment of the present disclosure. The data managing method includes the following steps. Firstly, performing step S710 to store a first data to a top of the first memory block in a top-down fashion. And then performing step S720 to store a first metadata corresponding to the first data to a bottom of the first memory block in a bottom-up fashion.

Figure 8A:
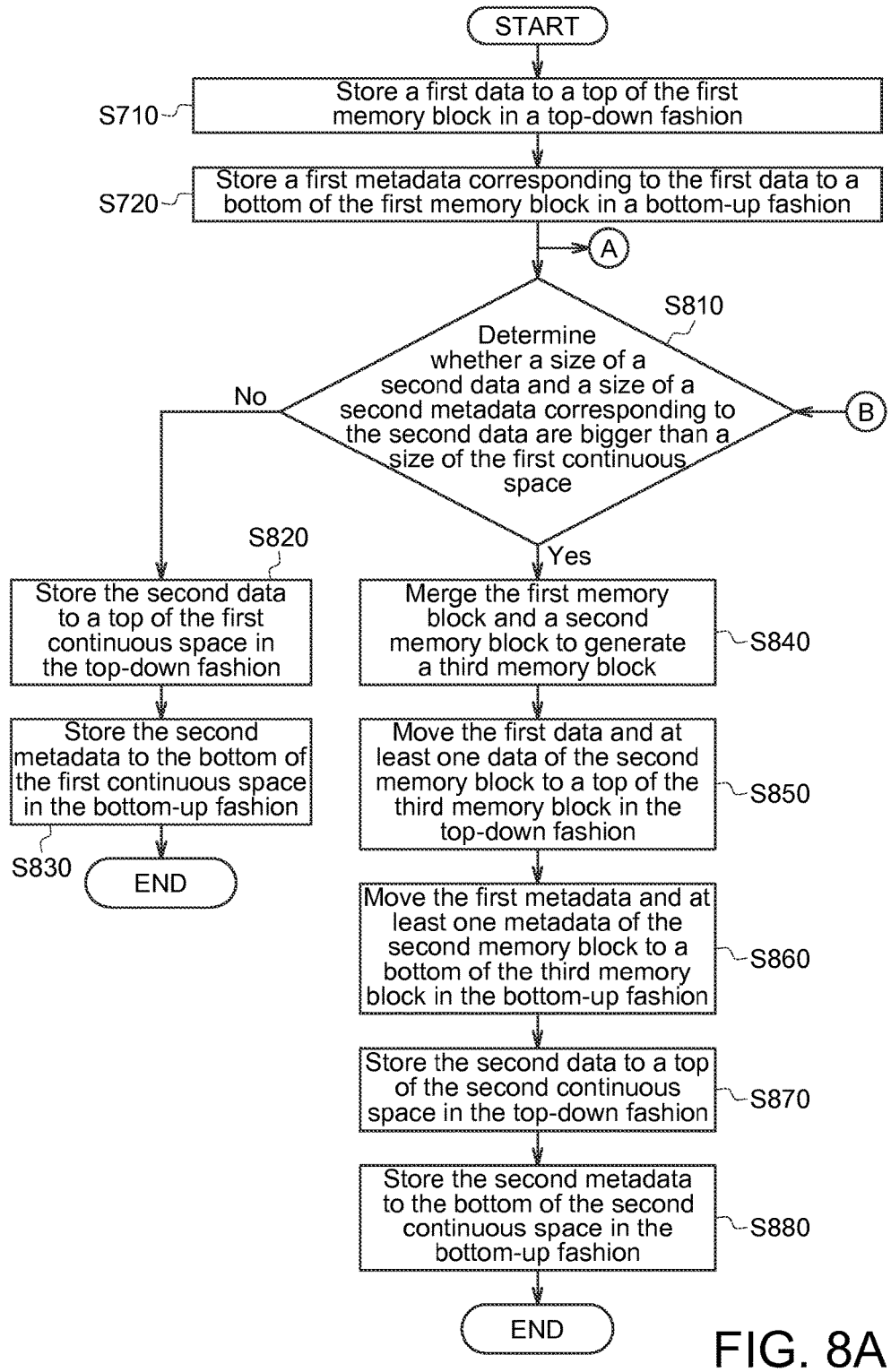
FIG. 8A and FIG. 8B show a flow chart of the data managing method for the memory system according to a fifth embodiment of the present disclosure.
Figure 8B:
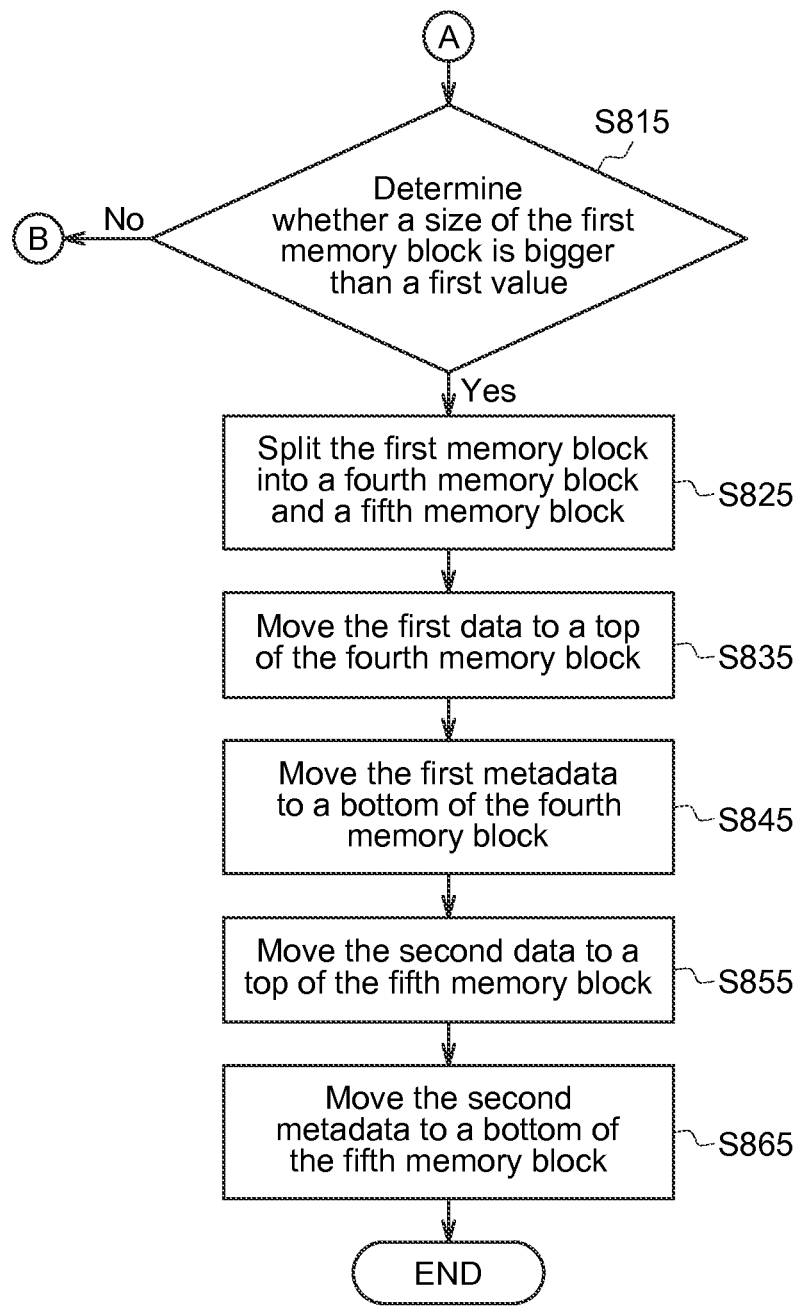

FIG. 8A and FIG. 8B show a flow chart of the data managing method for the memory system according to a fifth embodiment of the present disclosure. In this embodiment, the data managing method may perform step S810 to determine whether a size of a second data and a size of a second metadata corresponding to the second data are bigger than a size of the first continuous space. If the answer is no, then performing step S820 to store the second data to a top of the first continuous space in the top-down fashion, and then performing step S830 to store the second metadata corresponding to the second data to the bottom of the first continuous space in the bottom-up fashion.

However, if the size of the second data and the size of the second metadata corresponding to the second data are bigger than the size of the first continuous space, then performing step S840 to merge the first memory block and a second memory block to generate a third memory block. And then performing step S850 to move the first data and at least one data of the second memory block to a top of the third memory block in the top-down fashion, and then performing step S860 to move the first metadata corresponding to the first data and at least one metadata corresponding to the at least one data of the second memory block to a bottom of the third memory block in the bottom-up fashion. After the step of S860, the memory controller may further determine whether the merged memory block has enough continuous space, and then repeating the merging operation (S840-S860) until the merged memory block has enough continuous space. Afterwards, performing step S870 to store the second data to a top of the second continuous space in the top-down fashion, and performing step S880 to store the second metadata corresponding to the second data to the bottom of the second continuous space in the bottom-up fashion.

Moreover, the data managing method may include step S815 to determine whether a size of the first memory block is bigger than a first value. If the answer is no, then performing step S810 to determine whether a size of a second data and a size of a second metadata corresponding to the second data are bigger than a size of the first continuous space. On the other hand, if the size of the first memory block is bigger than the first value, then performing step S825 to split the first memory block into a fourth memory block and a fifth memory block. And then performing step S835 to move the first data to a top of the fourth memory block, and performing step S845 to move the first metadata corresponding to the first data to a bottom of the fourth memory block. And then performing step S855 to move the second data to a top of the fifth memory block, and performing step S865 to move the second metadata corresponding to the second data to a bottom of the fifth memory block.

Similarly, the memory controller may further determine whether the size of the fourth memory block is bigger than the first value, and then repeating the splitting operation (S825-S865) until the split memory block is not bigger than the first value.

Figure 9:
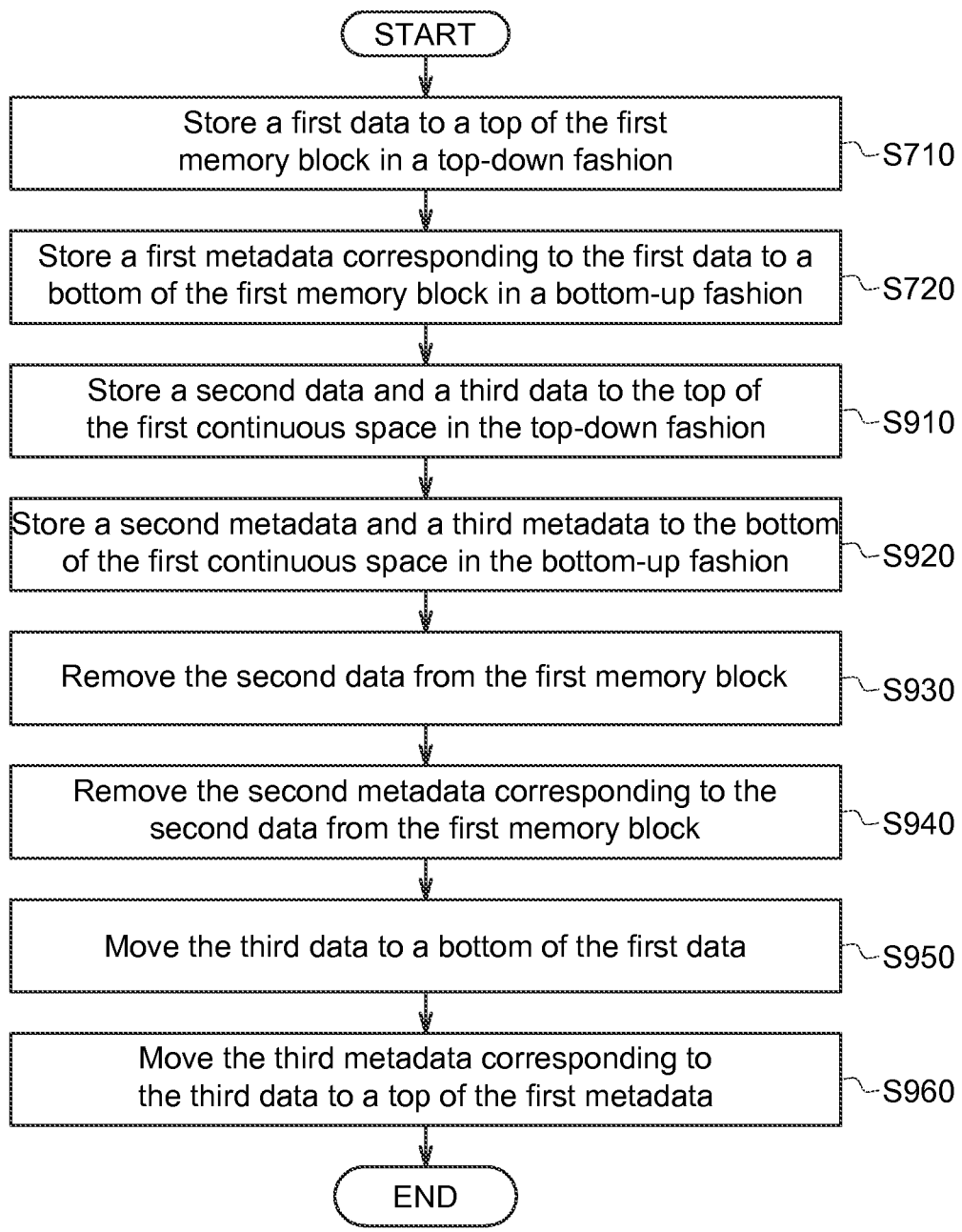
FIG. 9 shows a flow chart of the data managing method for the memory system according to the third embodiment of the present disclosure.

FIG. 9 shows a flow chart of the data managing method for the memory system according to the third embodiment of the present disclosure. In this embodiment, the data managing method may perform step S910 to store a second data and a third data to the top of the first continuous space in the top-down fashion. And then performing step S920 to store a second metadata corresponding to the second data and a third metadata corresponding to the third data to the bottom of the first continuous space in the bottom-up fashion. And then performing step S930 to remove the second data from the first memory block, and performing step S940 to remove the second metadata corresponding to the second data from the first memory block. Afterwards, performing step S950 to move the third data to a bottom of the first data, and performing step S960 to move the third metadata corresponding to the third data to a top of the first metadata.

In some embodiments, the memory block may include multiple data, and when one of the data is being removed from the memory block, performing the repacking operation (similar to steps S950-960) to move the following data of the removed data to the bottom of previous data in the top-down fashion, and move the following metadata of the removed metadata to the top of the previous metadata in the bottom-up fashion until there is no empty space between the multiple data and there is no empty space between the multiple metadata.

According to the above embodiments, several memory systems and several data managing methods are provided. By using the data managing methods such as repacking operation, the memory system may provide larger continuous space for storing different size of chunks and the empty space between chunks or between data is reduced. And the memory block may be merged or split by design so that the moderate size of the memory block is remained to provide a good balance between system performance and space utilization. Therefore a memory system with a large continuous space is feasible for allocating different size of data.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data managing method for a memory system, the memory system comprises a memory controller, a first memory block and a second memory block, and the data managing method comprise:
    storing a first data to a top of the first memory block in a top-down fashion; and
    storing a first metadata corresponding to the first data to a bottom of the first memory block in a bottom-up fashion;
    wherein the first data forms a first data area, the first metadata forms a first metadata area and a first continuous space is formed between a bottom of the first data area and a top of the first metadata area,
    when a size of a second data and a size of a second metadata corresponding to the second data are bigger than a size of the first continuous space:
    merging the first memory block and the second memory block to generate a third memory block;
    moving the first data and at least one data of the second memory block to a top of the third memory block in the top-down fashion;
    moving the first metadata corresponding to the first data and at least one metadata corresponding to the at least one data of the second memory block to a bottom of the third memory block in the bottom-up fashion.

2. The data managing method according to claim 1, further comprising:
    when the size of the second data and the size of the second metadata corresponding to the second data are not bigger than the size of the first continuous space:
    storing the second data to a top of the first continuous space in the top-down fashion; and
    storing the second metadata corresponding to the second data to a bottom of the first continuous space in the bottom-up fashion.

3. The data managing method according to claim 1, wherein the first data and the at least one data of the second memory block forms a second data area, the first metadata and the at least one metadata corresponding to the at least one data of the second memory block forms a second metadata area and a second continuous space is formed between a bottom of the second data area and a top of the second metadata area;
    storing the second data to a top of the second continuous space in the top-down fashion; and
    storing the second metadata corresponding to the second data to a bottom of the second continuous space in the bottom-up fashion.

4. The data managing method according to claim 1, further comprising:
    when a size of the first memory block is bigger than a first value:
    splitting the first memory block into a fourth memory block and a fifth memory block;
    moving the first data to a top of the fourth memory block;
    moving the first metadata corresponding to the first data to a bottom of the fourth memory block;
    moving the second data to a top of the fifth memory block; and
    moving the second metadata corresponding to the second data to a bottom of the fifth memory block.

5. The data managing method according to claim 1, further comprising:
    storing the second data and a third data to a top of the first continuous space in the top-down fashion; and
    storing the second metadata corresponding to the second data and a third metadata corresponding to the third data to a bottom of the first continuous space in the bottom-up fashion;
    wherein the first data, the second data, and the third data form a third data area;
    the first metadata corresponding to the first data, the second metadata corresponding to the second data, and the third metadata corresponding to the third data form a third metadata area; and
    a third continuous space is formed between a bottom of the third data area and a top of the third metadata area.

6. The data managing method according to claim 5, further comprising:
    removing the second data from the first memory block;
    removing the second metadata corresponding to the second data from the first memory block;
    moving the third data to a bottom of the first data; and
    moving the third metadata corresponding to the third data to a top of the first metadata;
    wherein the first data and the third data form a fourth data area;
    the first metadata corresponding to the first data and the third metadata corresponding to the third data form a fourth metadata area; and
    a fourth continuous space is formed between a bottom of the fourth data area and a top of the fourth metadata area.

7. A memory system, comprising:
    a memory controller;
    a first memory block, configured to:
    store a first data from a top of the first memory block in a top-down fashion, and
    store a first metadata corresponding to the first data from a bottom of the first memory block in a bottom-up fashion; and
    a second memory block, configured to:
    store at least one data from a top of the second memory block in the top-down fashion, and
    store at least one metadata corresponding to the at least one data from a bottom of the second memory block in the bottom-up fashion;
    wherein the first data forms a first data area, the first metadata forms a first metadata area and a first continuous space is formed between a bottom of the first data area and a top of the first metadata area,
    when a size of a second data and a size of a second metadata corresponding to the second data are bigger than a size of the first continuous space, the memory controller is further configured to:
    merge the first memory block and the second memory block to generate a third memory block;

move the first data and the at least one data of the second memory block to a top of the third memory block in the top-down fashion; and move the first metadata corresponding to the first data and the at least one metadata corresponding to the at least one data of the second memory block to a bottom of the third memory block in the bottom-up fashion.

8. The memory system according to claim 7, wherein when the size of the second data and the size of the second metadata corresponding to the second data are not bigger than the size of the first continuous space, the first memory block is configured to:

store the second data to a top of the first continuous space in the top-down fashion; and store the second metadata corresponding to the second data to a bottom of the first continuous space in the bottom-up fashion.

9. The memory system according to claim 7, wherein the first data and the at least one data of the second memory block forms a second data area, the first metadata and the at least one metadata corresponding to the at least one data of the second memory block forms a second metadata area and a second continuous space is formed between a bottom of the second data area and a top of the second metadata area; and the third memory block is configured to:

store the second data to a top of the second continuous space in the top-down fashion; and store the second metadata corresponding to the second data to a bottom of the second continuous space in the bottom-up fashion.

10. The memory system according to claim 7, wherein when a size of the first memory block is bigger than a first value, the memory controller is further configured to:

split the first memory block into a fourth memory block and a fifth memory block;

move the first data to a top of the fourth memory block;

move the first metadata corresponding to the first data to a bottom of the fourth memory block;

move the second data to a top of the fifth memory block; and move the second metadata corresponding to the second data to a bottom of the fifth memory block.

11. The memory system according to claim 7, wherein the first memory block is further configured to:

store the second data and a third data to a top of the first continuous space in the top-down fashion; and store the second metadata corresponding to the second data and a third metadata corresponding to the third data to a bottom of the first continuous space in the bottom-up fashion;

wherein the first data, the second data, and the third data form a third data area;

the first metadata corresponding to the first data, the second metadata corresponding to the second data, and the third metadata corresponding to the third data form a third metadata area; and a third continuous space is formed between a bottom of the third data area and a top of the third metadata area.

12. The memory system according to claim 11, wherein the memory controller is further configured to:

remove the second data from the first memory block;

remove the second metadata corresponding to the second data from the first memory block;

move the third data to a bottom of the first data; and move the third metadata corresponding to the third data to a top of the first metadata;

wherein the first data and the third data form a fourth data area;

the first metadata corresponding to the first data and the third metadata corresponding to the third data form a fourth metadata area; and a fourth continuous space is formed between a bottom of the fourth data area and a top of the fourth metadata area.

* * * * *